United States Patent
Anderson et al.

(10) Patent No.: US 11,137,032 B1
(45) Date of Patent: Oct. 5, 2021

(54) CERAMIC BEARING SYSTEM

(71) Applicants: Bell Textron Inc., Fort Worth, TX (US); United States of America as represented by the Secretary of the Army, Washington, DC (US)

(72) Inventors: Cody Anderson, Lantana, TX (US); Gilberto Morales, Arlington, TX (US); Lawrence Mark Zunski, Hayes, VA (US)

(73) Assignees: Bell Textron Inc., Fort Worth, TX (US); United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/887,526

(22) Filed: May 29, 2020

(51) Int. Cl.
| | |
|---|---|
| *F16C 19/04* | (2006.01) |
| *B64C 27/06* | (2006.01) |
| *F16C 19/18* | (2006.01) |
| *F16C 35/06* | (2006.01) |
| *F16C 35/07* | (2006.01) |
| *F16C 37/00* | (2006.01) |
| *F16C 35/073* | (2006.01) |
| *F16C 35/067* | (2006.01) |
| *F16C 33/58* | (2006.01) |

(52) U.S. Cl.
CPC ............ *F16C 37/007* (2013.01); *B64C 27/06* (2013.01); *F16C 19/04* (2013.01); *F16C 19/18* (2013.01); *F16C 33/583* (2013.01); *F16C 35/067* (2013.01); *F16C 35/073* (2013.01); *F16C 2202/22* (2013.01); *F16C 2206/40* (2013.01); *F16C 2226/10* (2013.01); *F16C 2326/43* (2013.01)

(58) Field of Classification Search
CPC ........ F16C 19/04; F16C 19/18; F16C 33/303; F16C 33/583; F16C 35/067; F16C 35/073; F16C 35/077; F16C 37/007; F16C 2202/22; F16C 2206/40; F16C 2226/10; F16C 2326/43; F16F 15/0237; B64C 27/06
USPC ............... 384/535–536, 581–582, 584–585; 403/371–371, 375
See application file for complete search history.

(56) References Cited

U.S. PATENT DOCUMENTS

| | | | | |
|---|---|---|---|---|
| 3,061,386 A | * | 10/1962 | Dix ....................... | F16D 1/0835 384/535 |
| 4,981,390 A | * | 1/1991 | Cramer, Jr. .......... | F16D 1/0835 403/355 |
| 6,280,095 B1 | * | 8/2001 | Furukoshi .............. | F02D 9/106 384/489 |
| 6,655,847 B2 | * | 12/2003 | Obara .................. | G11B 5/4813 384/535 |
| 6,939,052 B1 | * | 9/2005 | Hull ....................... | F16C 25/08 384/535 |
| 7,007,386 B1 | * | 3/2006 | Stover .................... | F16C 27/04 29/898.07 |

(Continued)

*Primary Examiner* — Marcus Charles
(74) *Attorney, Agent, or Firm* — Shackelford, Bowen, McKinley & Norton, LLP

(57) ABSTRACT

An example of a ceramic bearing system includes a shaft comprising two radially extending shoulders that define a channel therebetween, a first tolerance ring disposed in the channel of the shaft, and a bearing assembly comprising a ceramic bearing. The bearing assembly is positioned around the first tolerance ring and has an axial length that is longer than an axial length of the first tolerance ring.

20 Claims, 3 Drawing Sheets

(56) References Cited

U.S. PATENT DOCUMENTS

| | | | | |
|---|---|---|---|---|
| 7,637,667 | B1* | 12/2009 | Schaub | F16C 35/073 |
| | | | | 384/536 |
| 7,927,020 | B2* | 4/2011 | Faust | F16C 27/04 |
| | | | | 384/535 |
| 8,363,359 | B2* | 1/2013 | Slayne | G11B 5/4813 |
| | | | | 360/265.6 |
| 9,255,609 | B2* | 2/2016 | Araki | F16D 7/024 |
| 9,845,860 | B2* | 12/2017 | Lannutti | F16C 35/067 |
| 10,017,247 | B1* | 7/2018 | Elliott | B64C 27/06 |
| 10,371,212 | B2* | 8/2019 | Ehinger | F16C 35/077 |
| 10,704,608 | B2* | 7/2020 | Nakamura | F16D 7/021 |
| 2013/0017920 | A1 | 1/2013 | Sherrill et al. | |
| 2019/0112041 | A1* | 4/2019 | Haldeman | B64C 27/51 |

\* cited by examiner

CERAMIC BEARING SYSTEM

STATEMENT REGARDING FEDERALLY SPONSORED RESEARCH OR DEVELOPMENT

At least some of the subject matter disclosed in this application may have been made with government support under contract number W911W6-10-2-0007 awarded by the U.S. Army Aviation Applied Technology Directorate Program. The government may have certain rights in the invention.

TECHNICAL FIELD

The present disclosure relates generally to the use of ceramic bearings in rotorcraft and more particularly, but not by way of limitation, to the use of tolerance rings in combination with ceramic bearings.

BACKGROUND

This section provides background information to facilitate a better understanding of the various aspects of the disclosure. It should be understood that the statements in this section of this document are to be read in this light, and not as admissions of prior art.

Components of a rotorcraft are often exposed to a wide range of temperatures. For example, rotorcraft transmissions are often designed to operate in a temperature range of down to about −40° F. and up to about 250° F. One design consideration for rotorcraft transmissions is coefficient of thermal expansion (CTE) mismatch. CTE describes the change of an object's size with the change in the temperature of the object. With such a wide range of operating temperature, dimensions of components within the rotorcraft transmission can appreciably change. CTE mismatch occurs when neighboring components are made from materials having significant differences in their CTEs. If the CTE mismatch is large enough, failures can occur due to parts separating from one another or from induced stresses. To avoid such failures, materials are carefully selected so that neighboring components of the rotorcraft transmission that require specific tolerances, such as bearing assemblies, have similar CTEs. Selecting materials with similar CTEs allows the bearing assemblies and neighboring components to expand and contract at a similar rate such that proper fitments of the bearing assemblies are maintained throughout the wide range of operating temperatures.

While selecting materials having similar CTEs does reduce the likelihood of failures caused by CTE mismatch, it often prevents the use of materials that may otherwise have desirable properties. For example, conventional rotorcraft transmissions primarily use steel bearings that are mated to steel shafts. In recent years, bearings made from ceramic materials have been developed. Ceramic bearings have several advantages over steel bearings, especially for use in rotorcraft. For example, ceramic bearings weigh less than steel bearings and can provide longer service lives compared to steel bearings. Despite these advantages, ceramic bearings have not been used in rotorcraft transmissions because of CTE mismatch between the ceramic bearings and the steel shafts upon which the ceramic bearings would be mounted. Ceramics used to make bearings have a CTE of about $1.30 \times 10^{-6}$ and steels used to make the shafts upon which the bearings are mounted have a CTE of about $6.60 \times 10^{-6}$. This mismatch has caused failures in testing resulting from the bearings becoming loose on the shaft in cold temperatures because the shaft shrinks more than the bearings and from the bearings fracturing because the shaft expands more than the bearings at high temperatures.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a ceramic bearing system includes a shaft comprising two radially extending shoulders that define a channel therebetween, a first tolerance ring disposed in the channel of the shaft, and a bearing assembly comprising a ceramic bearing. The bearing assembly is positioned around the first tolerance ring and has an axial length that is longer than an axial length of the first tolerance ring.

An example of a ceramic bearing system includes a shaft comprising two radially extending shoulders that define a channel therebetween, a first tolerance ring disposed in the channel of the shaft, and a bearing assembly comprising a ceramic bearing. The bearing assembly is positioned around the first tolerance ring and has an axial length that is longer than an axial length of the channel so that the bearing assembly extends over at least part of the two radially extending shoulders.

An example of a ceramic bearing system includes a shaft comprising two radially extending shoulders that define a channel therebetween, a first tolerance ring disposed in the channel of the shaft, and a bearing assembly comprising a ceramic bearing. The bearing assembly is positioned around the first tolerance ring. A second tolerance ring is disposed around the bearing assembly.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
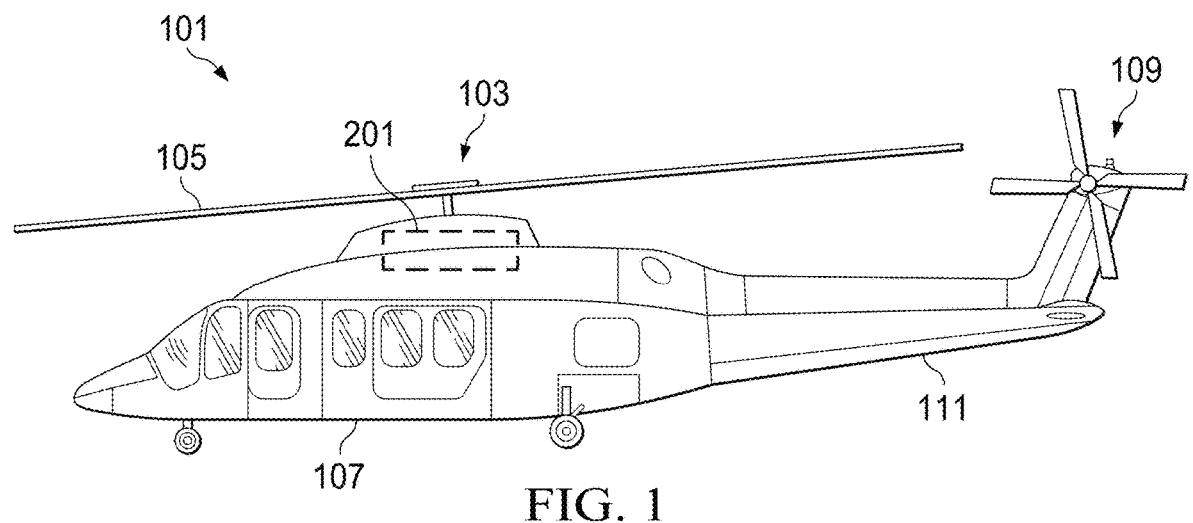
FIG. 1 is a perspective view of a rotorcraft, according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a rotorcraft 101, according to aspects of the disclosure.

Rotorcraft 101 is illustrated as a helicopter, but those having skill in the art will recognize the instant disclosure is applicable to other types of rotorcraft, such as tiltrotor aircraft. Rotorcraft 101 includes a rotor system 103 with multiple rotor blades 105. The pitch of each rotor blade 105 can be manipulated in order to selectively control direction, thrust, and lift of rotorcraft 101. Rotorcraft 101 includes a fuselage 107, anti-torque system 109, and an empennage 111. Rotorcraft 101 also includes a transmission 201 for transferring power from one or more rotorcraft engines (not shown) to the rotor system 103. Transmission 201 can also be configured to transfer power from one or more rotorcraft engines to anti-torque system 109 and other accessories during normal flight conditions. Transmission 201 can also be configured to reduce engine output rpm to an optimum rotor rpm. Transmission 201 can also be configured to change the axis of rotation. For example, in tiltrotor aircraft that include horizontally mounted engines, transmission 201 can be configured to change the axis of rotation of the rotor blades from a horizontal axis of the engines to a vertical axis.

Figure 2:
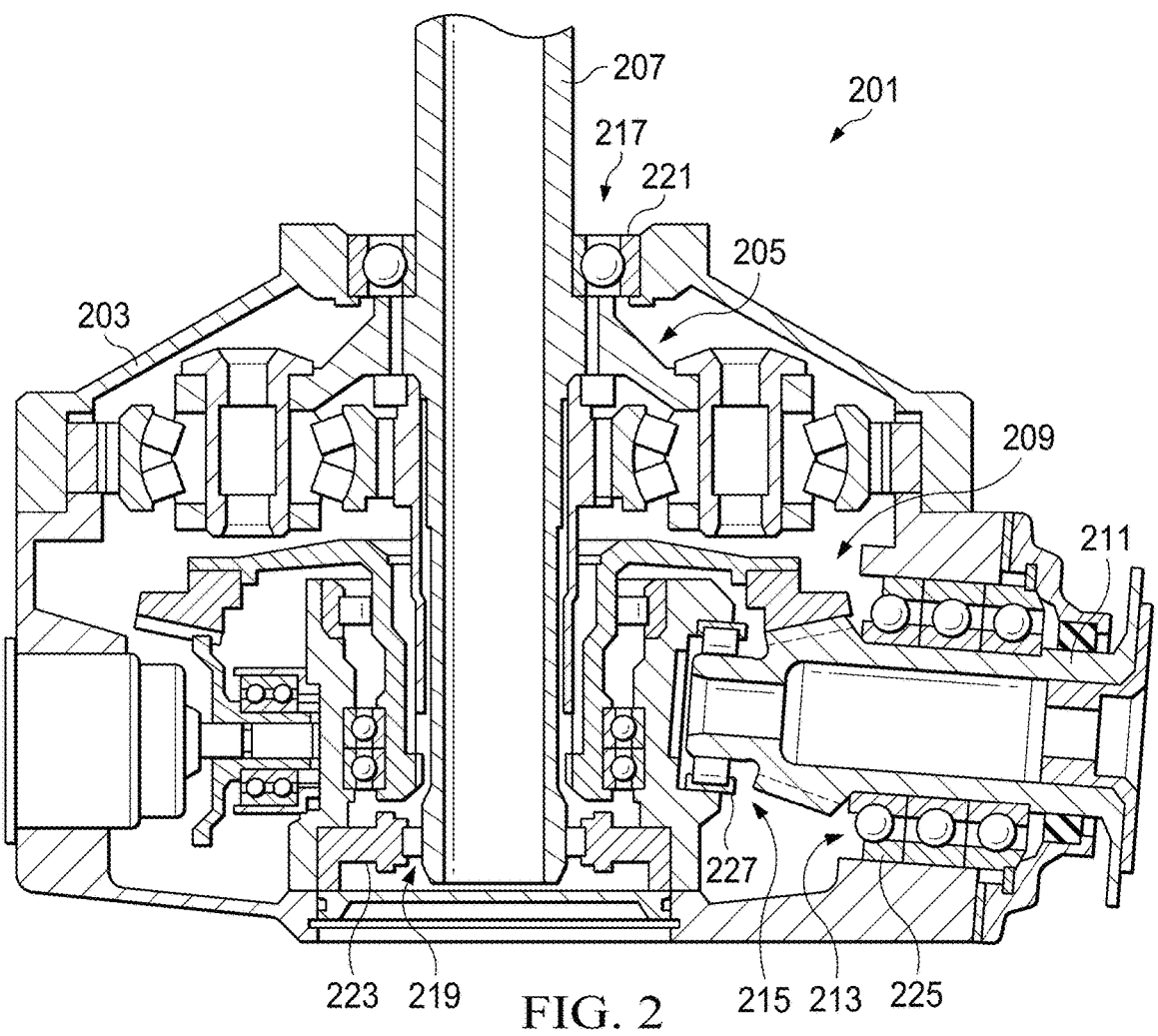
FIG. 2 is a cross-sectional view of a rotorcraft transmission, according to aspects of the disclosure.

FIG. 2 is a cross-sectional view of transmission 201. Transmission 201 is a conventional rotorcraft transmission. Transmission 201 includes a case 203 in which a plurality of bearing assemblies that support various moving and/or rotating members are housed. Transmission 201 includes a first receiving portion 205 configured to receive a main rotor shaft 207 and a second receiving portion 209 configured to receive an input shaft 211. As illustrated in FIG. 2, input shaft 211 is a spiral bevel input pinion. Input shaft 211 is supported by bearing assemblies 213 and 215. Transmission 201 also includes bearing assemblies 217, 219, and 221 that support main rotor shaft 207. Input shaft 211 couples to a main drive shaft that receives power from an engine of rotorcraft 101. Main rotor shaft 207 carries power from transmission 201 to rotor blades 105.

In a conventional transmission, like transmission 201, bearing assemblies 213, 215 and input shaft 211 are typically made from steel, such as 9310 or M50 that have a CTE of $6.60 \times 10^{-6}$. One reason in particular that bearing assemblies 213, 215 and input shaft 211 are all made from steel is to avoid problems stemming from CTE mismatch. CTE describes the rate of change of an object's size with the rate change in the temperature of the object. Rotorcraft transmissions must be capable of operating throughout a wide range of temperatures (e.g., from about −40° F. to about 250° F.). With such a wide range in operating temperatures, dimensions of components of transmission 201 can appreciably change. For components of transmission 201 that require tighter tolerances, such as the mating of bearing assemblies 213, 215 to the input shaft 211, using materials with similar CTEs allows each of the components to expand and contract at a similar rate such that proper fitment between the components is maintained throughout a wide range of temperatures. For example, bearing assemblies 213, 215 and input shaft 211 are conventionally made of steel. As a result, bearing assemblies 213, 215 remain properly seated upon spiral bevel input pinon 211 as bearing assemblies 213, 215 will expand and contract similar amounts as the temperature of transmission 201 fluctuates during the operation thereof.

CTE mismatch occurs when materials having different CTEs are used. If the CTE mismatch is significant enough, failures can occur. For example, ceramic bearings are relatively new and can significantly outperform conventional steel bearings. In particular, ceramic bearings weigh less than steel bearings and additionally offer a longer service life compared to steel bearings, as ceramic bearings do not wear as quickly as steel bearings. As weight reduction is a constant pursuit in the aerospace field, the use of ceramic bearings instead of conventional steel bearings is preferable. However, the use of ceramic bearings in rotorcraft transmissions presents certain challenges regarding CTE mismatch. As noted above, spiral bevel input pinion 211 is often made of 9310 steel having a CTE of $6.60 \times 10^{-6}$. Case 203 is often made of aluminum having a CTE of $1.30 \times 10^{-5}$. Ceramic bearings made from silicon nitride have a CTE of $1.30 \times 10^{-6}$.

The large mismatch between the CTEs of 9310 steel, aluminum, and silicon nitride, combined with the large operating temperature range of rotorcraft transmissions, makes it quite difficult to safely secure ceramic bearings to input shaft 211. The difference in expansion and contraction of these components can lead to a variety of failures. For example, incorporating ceramic bearings can lead to unacceptably high case stresses at low temperatures due to the contraction of the aluminum, or unacceptably high radial clearance between the ceramic bearing and the case. Additionally, the fitment of the ceramic bearing relative to the spiral bevel input pinon can be similarly challenging. For example, CTE mismatch can result in situations where input shaft 211 imparts large hoop stresses upon the ceramic bearing, which can cause the ceramic bearing to fail as ceramic bearings are unable to withstand large hoop stresses. Thus, in order to overcome this difficulty, tolerance rings may be incorporated into a rotorcraft transmission, such as transmission 201, to allow CTE mismatch between the ceramic bearings and other components of the rotorcraft transmission (e.g., the transmission case and the spiral bevel input pinion).

Figure 3A:
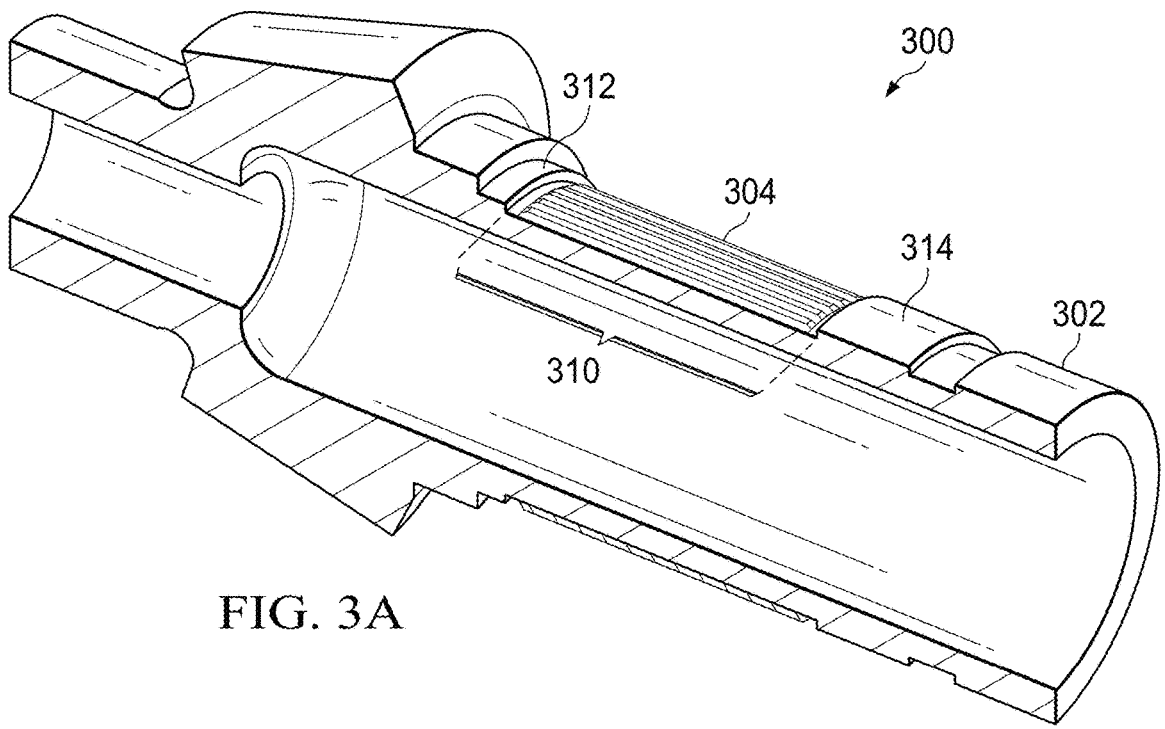
FIGS. 3A-3C are perspective views of a bearing system, according to aspects of the disclosure.
Figure 3B:
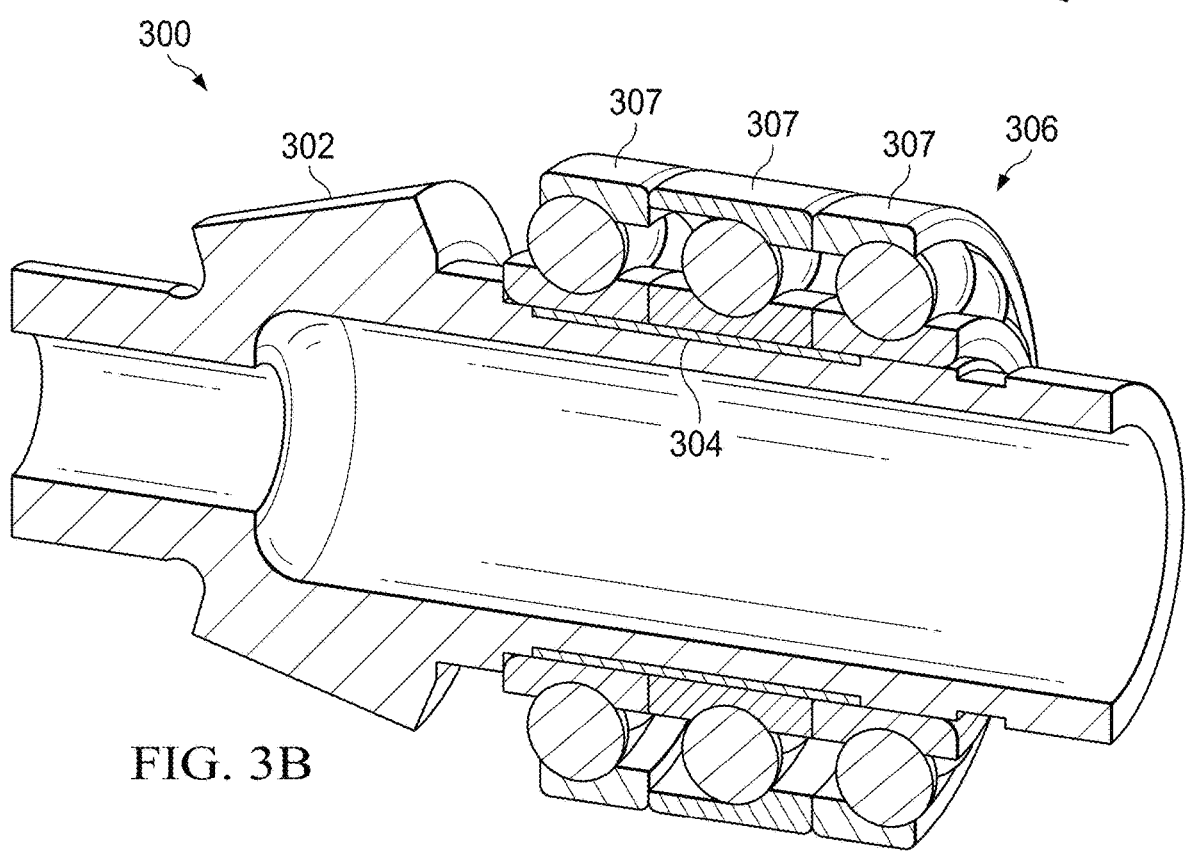
Figure 3C:
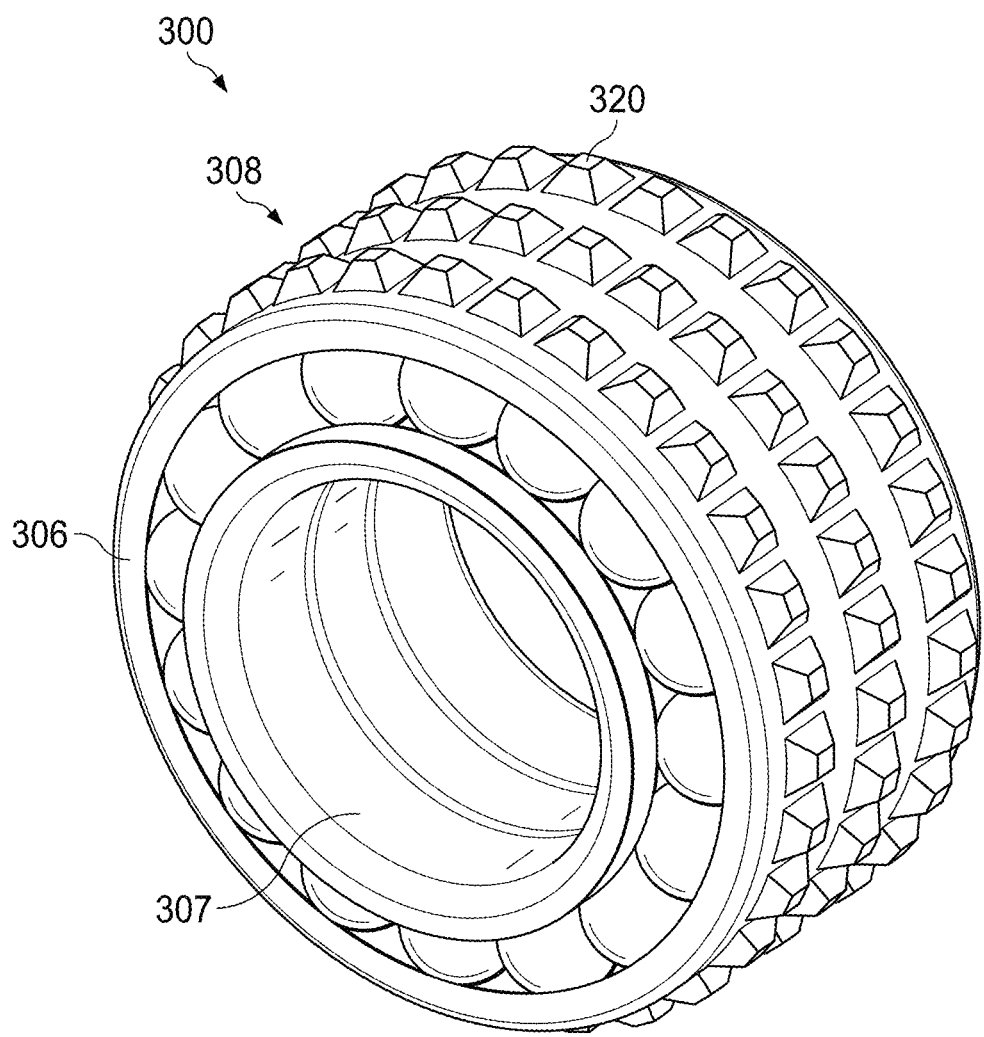

FIGS. 3A-3C illustrate a ceramic bearing system 300 for use with rotorcraft transmissions (e.g., transmission 201), according to aspects of the disclosure. FIG. 3A is a sectioned perspective view of a tolerance ring 304 positioned on an input shaft 302, FIG. 3B is a perspective view of a bearing assembly 306 positioned on input shaft 302, and FIG. 3C is a perspective view of a tolerance ring 308 positioned on bearing assembly 306. Ceramic bearing system 300 includes input shaft 302, tolerance ring 304 (best seen in FIG. 3A), bearing assembly 306 that includes one or more ceramic bearings 307, and tolerance ring 308 (best seen in FIG. 3C). Ceramic bearing system 300 may be used in place of input shaft 211 and bearing assembly 213. Input shaft 302 is used by way of example and it will be appreciated by those having skill in the art that ceramic bearing system 300 may be used with any shaft, not just input shaft 302.

In contrast to bearing assembly 213, which uses steel bearings that are pressed onto steel input shaft 211, bearing assembly 306 uses ceramic bearings 307 that are dimensioned to have a greater inner diameter than the outer diameter of input shaft 302 when transmission 201 is at room temperature. Instead of using a press fit to secure bearing assembly 306 to input shaft 302, tolerance ring 304 is positioned therebetween. Tolerance ring 304 acts as a radial spring that is radially biased against an inner surface of bearing assembly 306 and an outer surface of input shaft 302 to secure bearing assembly 306 to input shaft 302. Tolerance ring 304 permits CTE mismatch between input shaft 302, which is made of steel, and bearing assembly 306, which is made of ceramic. Using tolerance ring 304 instead of a press fit to secure bearing assembly 306 to input shaft 302 reduces, and in some cases eliminates, the formation of tensile hoop stresses caused by expansion of input shaft 302. In some aspects, the radial force of tolerance ring 304 upon the inner surface of bearing assembly 306 is sufficient to hold bearing assembly 306 in place, which eliminates the need for keys, pins, retainers, and the like to retain bearing assembly 306 on input shaft 302. In some aspects, ceramic bearing assembly 306 may be fitted to input shaft 302 using a press fit that is looser than the press fit used between bearing assembly 213 and steel input shaft 211. A looser fit may be used as tolerance ring 304 helps to secure bearing assembly 306.

As noted above, the bearings of bearing assembly 306 are ceramic. FIGS. 3B and 3C illustrate bearing assembly 306 having three ceramic bearings 307. In other aspects, more or fewer ceramic bearings 307 may be used as dictated by design requirements. Compared to steel, ceramic materials fail at much lower tensile loads. If ceramic bearings 307 were secured to input shaft 302 via press fits, the relatively large CTE mismatch between input shaft 302 (9310 steel—$6.60 \times 10^{-6}$) and ceramic bearings 307 (Silicon Nitride—$1.30 \times 10^{-6}$) can lead to failure of bearing assembly 306. For example, as the temperature of transmission 201 rises, the diameter of input shaft 302 increases. Because the CTE of input shaft 302 is greater than the CTE of bearing assembly 306, the hoop stress induced upon ceramic bearings 307 by input shaft 302 increases as the temperature of transmission 201 increases. Because ceramics cannot withstand large tensile loads, ceramic bearings 307 would be prone to failure. To avoid inducing large hoop stresses upon ceramic bearings 307, tolerance rings 304, 308 are used. Tolerance rings come in a variety of configurations, but generally are ring-like sheets that include surface features that allow the tolerance ring to elastically expand and contract. By way of example, the surface features may include wave-like undulations or protrusions that can elastically deform under load. FIG. 3C illustrates a plurality of surface features 320 formed into tolerance ring 308.

As illustrated in FIGS. 3A and 3B, tolerance ring 304 sits within a channel 310 of input shaft 302. Shoulders 312, 314 extend radially outward from input shaft 302 on either side of channel 310. In some aspects, channel 310 may be machined into input shaft 302. In some aspects, shoulders 312, 314 may be separate pieces that are positioned on input shaft 302 to form channel 310 therebetween.

As seen in FIG. 3B, tolerance ring 304 only extends under a portion of bearing assembly 306. End portions of bearing assembly 306 extend over shoulders 312, 314. In other words, an axial length of tolerance ring 304 is less than an axial length of bearing assembly 306. An axial length of channel 310 is also less than the axial length of bearing assembly 306. The axial length of bearing assembly 306 is intentionally greater than the axial length of tolerance ring 304/channel 310 to help prevent harmonic resonances from developing during operation of transmission 201. Harmonic resonances may be generated if bearing assembly 306 is fit too loosely upon input shaft 302. To prevent formation of harmonic resonances, shoulders 312, 314 are dimensioned to have diameters that are less than the inner diameter of bearing assembly 306 when transmission 201 is below a threshold temperature. The threshold temperature may be, for example, room temperature or a temperature between about 140-190° F. For example, in one aspect, shoulders 312, 314 are dimensioned to not contact the inner surface of bearing assembly 306 when transmission 201 is below a threshold temperature of 150° F. In other words, below 150° F., the outer diameters of shoulders 312, 314 are less than the inner diameter of bearing assembly 306 and the outer surface of shoulders 312, 314 do not contact the inner surface of bearing assembly 306. However, when the temperature of transmission 201 transitions past the threshold temperature, the outer diameter of shoulders 312, 314 becomes larger than the inner diameter of bearing assembly 306 and the outer diameter of shoulders 312, 314 contact the inner surface of bearing assembly 306. At temperatures above the threshold temperature, a force fit exists between shoulders 312, 314 and the end portions of bearing assembly 306. This force fit tightens the fit between bearing assembly 306 and input shaft 302, which increases stiffness of ceramic bearing system 300 and reduces the likelihood of harmonic resonance issues. This design allows a reduction in harmonic resonance issues, while at the same time minimizing the amount of hoop stress induced upon bearing assembly 306.

FIG. 3C illustrates fitment of tolerance ring 308 upon bearing assembly 306. Similar to tolerance ring 304, tolerance ring 308 may be positioned between bearing assembly 306 and second receiving portion 209 to accommodate CTE mismatch therebetween. Second receiving portion 209 is part of case 203, which is made of aluminum. Inclusion of tolerance ring 308 further improves the ability of ceramic bearing system 300 to account for thermal expansion of input shaft 302 and case 203 and to prevent bearing assembly 306 from separating from second receiving portion 209. Tolerance ring 308 is radially biased against an outer surface of ceramic bearings 307 of bearing assembly 306 and an inner surface of case 203. Tolerance ring 308 also induces a small amount of compressive stress upon bearing assembly 306, which can help offset some of the hoop stress that input shaft 302 imparts upon bearing assembly 306 when the temperature of transmission 201 exceeds the threshold temperature. In some aspects, tolerance ring 308 may be eliminated and only tolerance ring 304 is included in ceramic bearing system 300.

In some aspects, tolerance ring 304 has an axial length that is greater than an axial length of bearing assembly 306. In such aspects, input shaft 302 does not directly contact bearing assembly 306.

As will be appreciated by those having skill in the art, ceramic bearing system 300 may be adapted for use with a variety of bearing/shaft configurations. For example, a similar design may be used in place of bearing assemblies 217, 219, and 221. Ceramic bearing system 300 may also be adapted for use with large diameter bearings having thin cross sections, such as, for example, swash plate bearings. For bearings having a large outer diameter, positioning a tolerance ring around the bearing applies a minimum amount of force to the outer diameter of the bearing at high temperatures. This force is necessary for bearings having large outer diameters because the CTE is expressed as the expansion for a standard unit of length. The larger the outer diameter of the bearing is, the greater the expansion/contraction value. Bearing system 300 may also be used in a variety of applications other than rotorcraft, such as boats, automobiles, and rotating machinery.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A ceramic bearing system comprising:
a shaft comprising two radially extending shoulders that define a channel therebetween;
a first tolerance ring comprising surface features that allow the first tolerance ring to elastically expand and contract;
a bearing assembly comprising a ceramic bearing, the bearing assembly positioned around the first tolerance ring and having an axial length that is longer than an axial length of the first tolerance ring; and
wherein the first tolerance ring is mounted in the channel.

2. The ceramic bearing system of claim 1, wherein:
at a first temperature, the two radially extending shoulders have a diameter that is smaller than an inner diameter of the ceramic bearing; and
at a second temperature higher than the first temperature, the two radially extending shoulders have a diameter that is greater than an inner diameter of the ceramic bearing.

3. The ceramic bearing system of claim 1, wherein:
the shaft is made of a material having a first coefficient of thermal expansion;
the ceramic bearing has a second coefficient of thermal expansion that is smaller than the first coefficient of thermal expansion.

4. The ceramic bearing system of claim 1, wherein the first tolerance ring is radially biased against an inner surface of the ceramic bearing.

5. The ceramic bearing system of claim 1, comprising a second tolerance ring positioned around an outer surface of the ceramic bearing.

6. The ceramic bearing system of claim 5, wherein the second tolerance ring is radially biased against the outer surface of the ceramic bearing.

7. The ceramic bearing system of claim 1, wherein the first tolerance ring secures the ceramic bearing to the shaft without a pin or a key.

8. A ceramic bearing system comprising:
a shaft comprising two radially extending shoulders that define a channel therebetween;
a first tolerance ring disposed in the channel of the shaft comprising surface features that allow the first tolerance ring to elastically expand and contract;
a bearing assembly comprising a ceramic bearing, the bearing assembly positioned around the first tolerance ring and having an axial length that is longer than an axial length of the channel so that the bearing assembly extends over at least part of the two radially extending shoulders; and
wherein the first tolerance ring is mounted in the channel.

9. The ceramic bearing system of claim 8, wherein:
at a first temperature, the two radially extending shoulders have a diameter that is smaller than an inner diameter of the ceramic bearing; and
at a second temperature higher than the first temperature, the two radially extending shoulders have a diameter that is greater than an inner diameter of the ceramic bearing.

10. The ceramic bearing system of claim 8, wherein:
the shaft is made of a material having a first coefficient of thermal expansion;
the ceramic bearing has a second coefficient of thermal expansion that is smaller than the first coefficient of thermal expansion.

11. The ceramic bearing system of claim 8, wherein the first tolerance ring is radially biased against an inner surface of the ceramic bearing.

12. The ceramic bearing system of claim 8, comprising a second tolerance ring positioned around an outer surface of the ceramic bearing.

13. The ceramic bearing system of claim 12, wherein the second tolerance ring is radially biased against the outer surface of the ceramic bearing.

14. The ceramic bearing system of claim 8, wherein the first tolerance ring secures the ceramic bearing to the shaft without a pin or a key.

15. A ceramic bearing system comprising:
a shaft comprising two radially extending shoulders that define a channel therebetween;
a first tolerance ring and comprising surface features that allow the first tolerance ring to elastically expand and contract; and
a bearing assembly comprising a ceramic bearing, the bearing assembly being positioned around the first tolerance ring;
a second tolerance ring disposed around an outer surface of the bearing assembly; and
wherein the first tolerance ring is mounted in the channel.

16. The ceramic bearing system of claim 15, wherein:
at a first temperature, the two radially extending shoulders have a diameter that is smaller than an inner diameter of the ceramic bearing; and
at a second temperature that is higher than the first temperature, the two radially extending shoulders have a diameter that is greater than an inner diameter of the ceramic bearing.

17. The ceramic bearing system of claim 15, wherein:
the shaft is made of a material having a first coefficient of thermal expansion;
the ceramic bearing has a second coefficient of thermal expansion that is smaller than the first coefficient of thermal expansion.

18. The ceramic bearing system of claim 15, wherein the first tolerance ring is radially biased against an inner surface of the ceramic bearing.

19. The ceramic bearing system of claim 15, wherein the second tolerance ring is radially biased against the outer surface of the ceramic bearing.

20. The ceramic bearing system of claim 15, wherein the first tolerance ring secures the ceramic bearing to the shaft without a pin or a key.

* * * * *